Sept. 5, 1967     G. B. BURCHELL     3,339,545

RESPIRATORY APPARATUS

Filed March 16, 1964     6 Sheets-Sheet 1

Sept. 5, 1967
G. B. BURCHELL
3,339,545
RESPIRATORY APPARATUS
Filed March 16, 1964
6 Sheets-Sheet 5
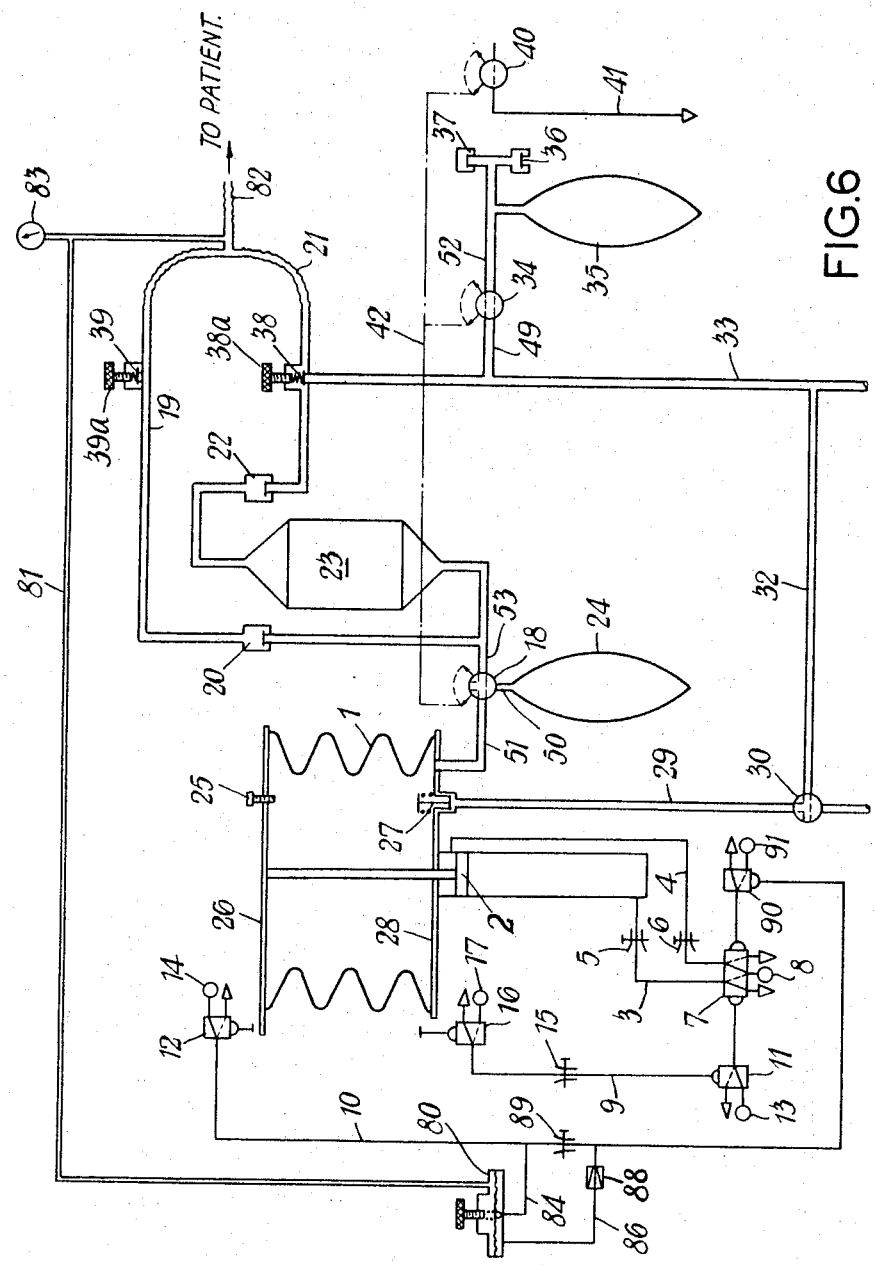

United States Patent Office 3,339,545
Patented Sept. 5, 1967

3,339,545
RESPIRATORY APPARATUS
Geoffrey Barnett Burchell, 10 Nelmes Road,
Hornchurch, Essex, England
Filed Mar. 16, 1964, Ser. No. 352,088
Claims priority, application Great Britain, Mar. 20, 1963,
11,149/63
15 Claims. (Cl. 128—145.8)

According to the present invention, there is provided a respiratory apparatus comprising a container for connection via an exhalation duct with a patient's lungs, wall means of said container movable to contract the interior of said container and to expand said interior to draw exhalation gas through said exhalation duct, driving means for moving said wall means to expand and contract said interior, conduit means leading from said interior to a location at which there is substantially atmospheric pressure at least, valve means serving to control the flow of gas through said conduit means, actuating means cooperating with said valve means for opening said valve means when there is approximately maximum positive pressure in said lungs thereby to connect said lungs to said location by way of said exhalation duct and said interior, and adjustable control means for adjustably controlling the time interval over which said valve means is open.

Figure 7:
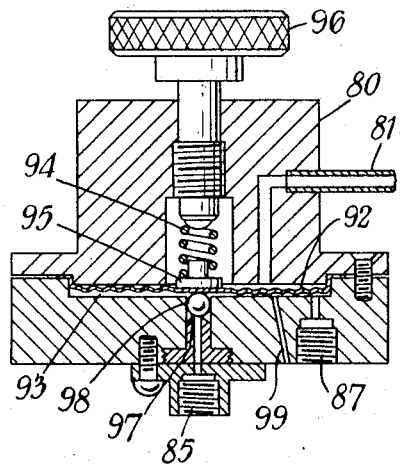
Figure 1:
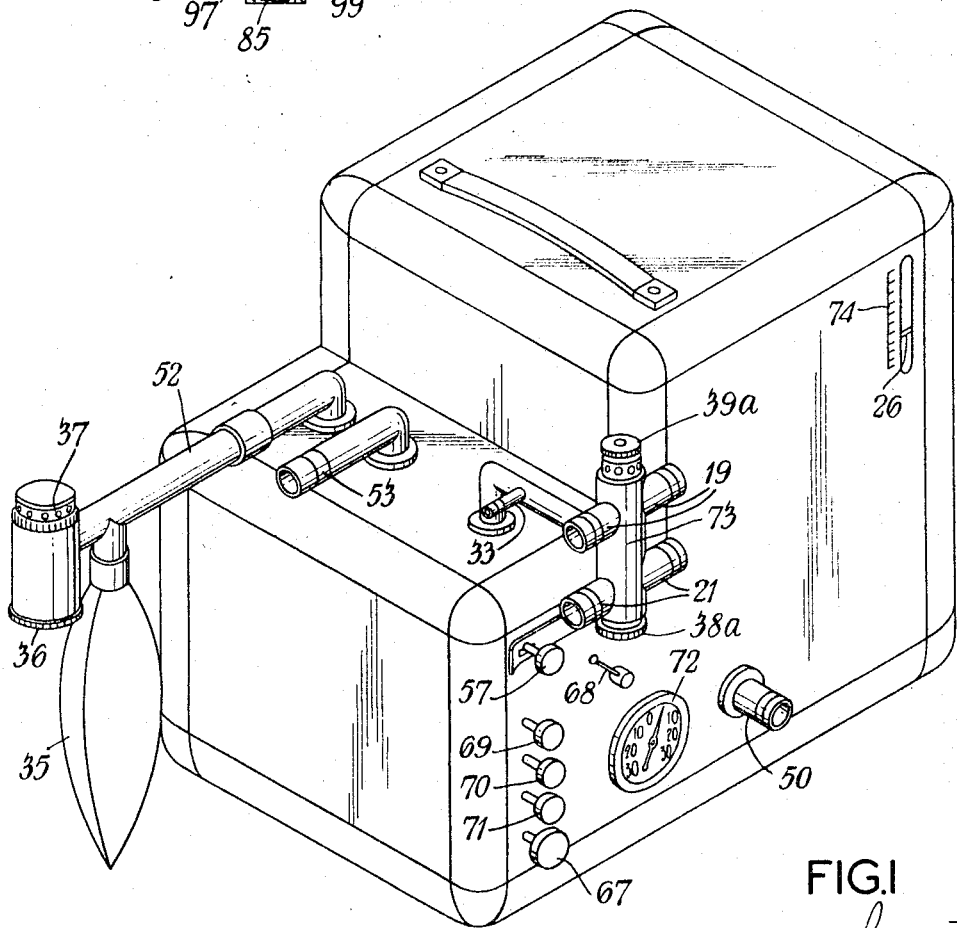
Figure 2:
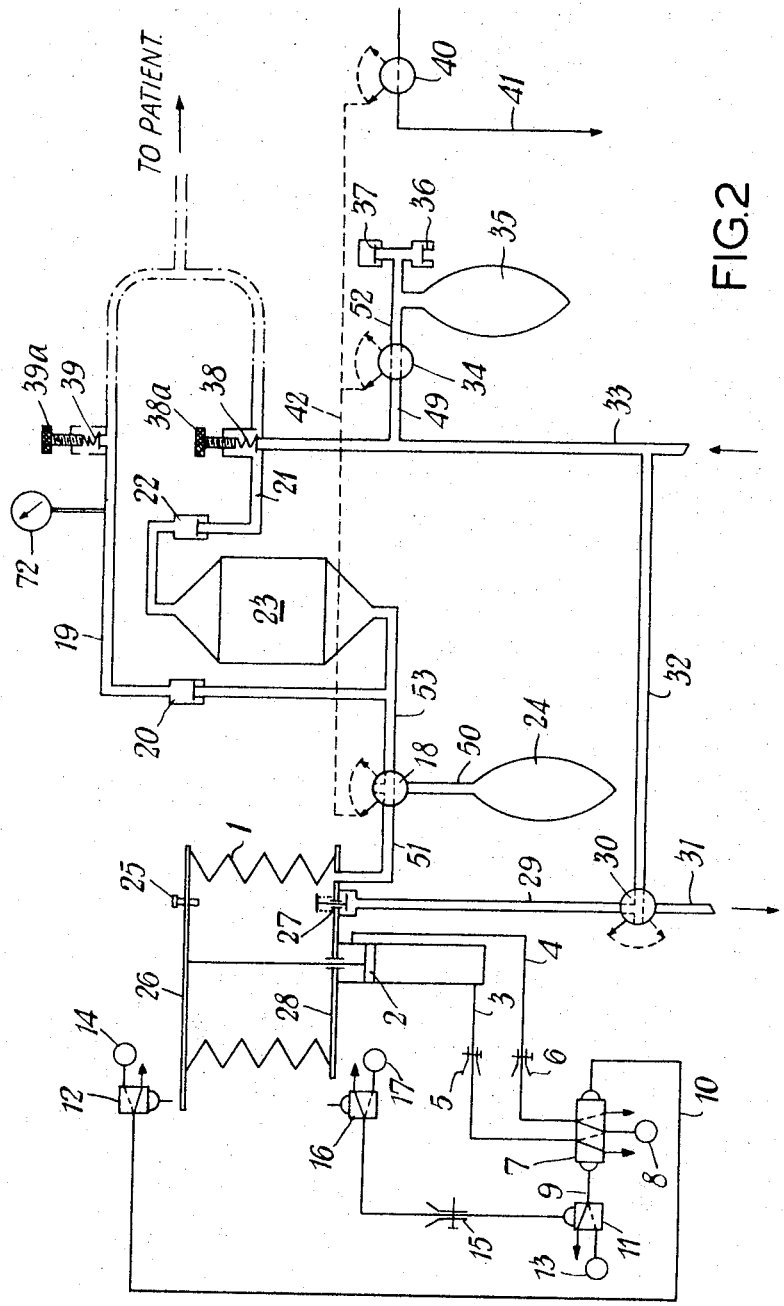
Figure 3:
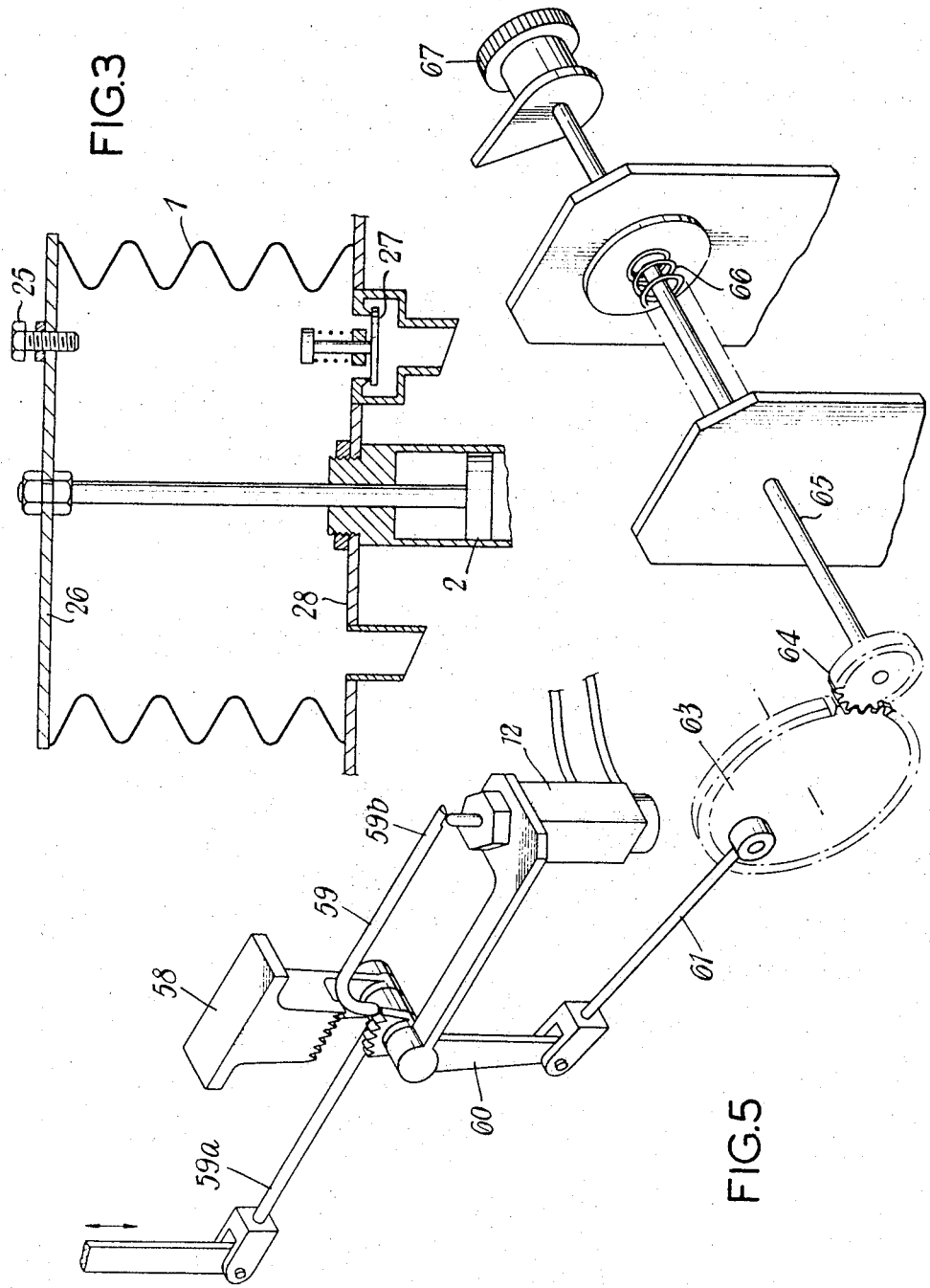
Figure 4:
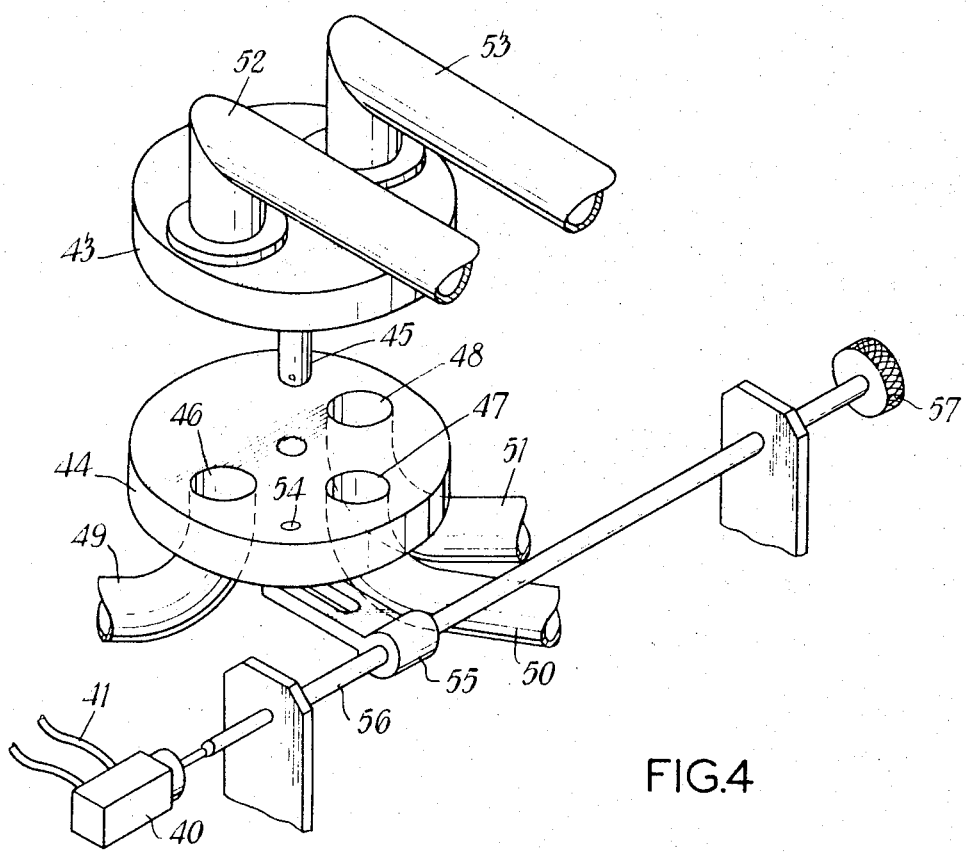
Figure 8:
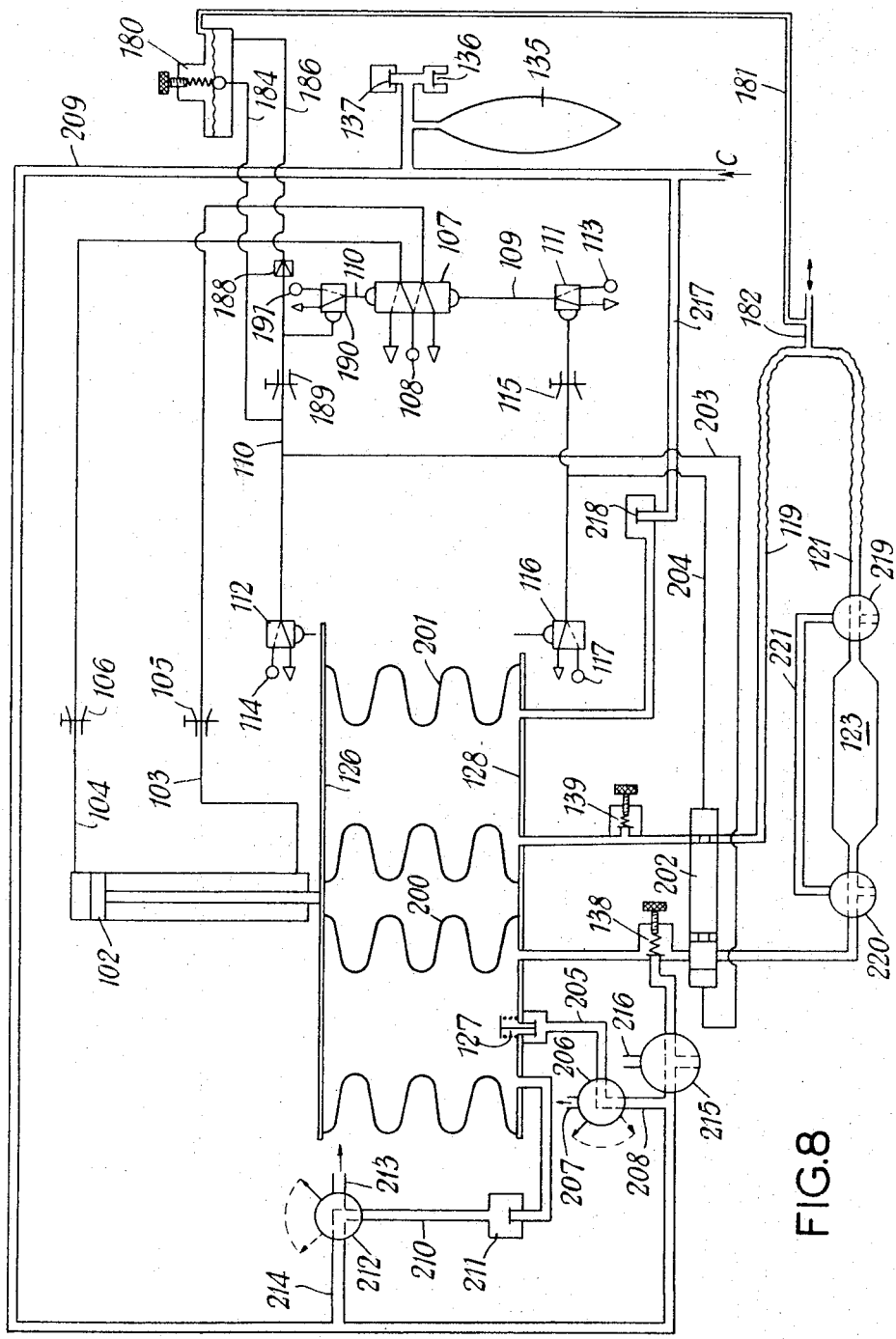

In order that the invention may be clearly understood and readily carried into effect, reference will now be made by way of example to the accompanying drawings, in which:

FIGURE 1 shows a top perspective view of a unit forming part of a respiratory apparatus, FIGURE 2 is a diagrammatic view of the apparatus, FIGURE 3 is a sectional view through another part of the apparatus, FIGURE 4 is a perspective exploded view of a further part of the apparatus, FIGURE 5 is a perspective view of a yet further part of the apparatus, FIGURE 6 is a diagrammatic view of a modified version of the apparatus, FIGURE 7 is a sectional view through part of the modified version shown in FIGURE 6, and FIGURE 8 is a diagrammatic view of a second modified version of the apparatus.

The unit shown in FIGURE 1 is intended to be connected up to a conventional circle absorber. FIGURE 2 shows the unit and the circle absorber connected up together.

Referring particularly to FIGURE 2, the apparatus comprises a bellows 1 which is driven by a double-acting piston-and-cylinder device 2. This device is connected to pipe-lines 3 and 4 containing adjustable throttles 5 and 6 for controlling the speeds of the piston in respective directions. The pipe lines 3 and 4 lead to a four-way, five-port, piston or changeover valve 7 which is connected to a compressed-air supply point 8. The valve 7 is so arranged that it can, in turn, either connect the line 3 to the atmosphere and connect the line 4 to the supply point 8 (as shown), or vice versa. The operation of the valve 7 is controlled, via pipe lines 9 and 10, by two-way, three-port, poppet or trigger valves 11 and 12 each of which is so arranged that it can be either connected to a compressed-air supply point 13 or 14, or connected to the atmosphere. The valve 12 is adjustable in position and operated by the bellows 1, as will be described more fully with reference to FIGURE 5. The valve 11 is controlled, via a delay device in the form of a throttle 15, by a trigger valve 16 which is connected to a compressed-air supply point 17 and which is similar to the valve 12 except that it is fixed in position.

The bellows 1 supplies inhalation gas to the patient via a two-way, three-port, valve 18 and an inhalation duct 19 containing a non-return, inhalation valve 20. Exhalation gas is drawn into the bellows 1 via the valve 18 and an exhalation duct 21 in which is a non-return, exhalation valve 22 and a carbon dioxide absorber 23 containing soda-lime. At the three-port valve 18, a flexible duct 51 leads to the bellows 1, a flexible duct 53 leads to the junction of the ducts 19 and 21, and a flexible duct 50 leads to a bag 24 for use in manual operation.

A set screw 25 adjustably mounted in the movable stiff wall 26 of the bellows 1 is arranged to strike, and thus open, the valve closure member of a non-return valve 27 provided in the fixed stiff wall 28 of the bellows. The interior of the bellows is connected via the valve 27 to a conduit 29 leading via a two-way, three-port valve 30 and a conduit 31 to the atmosphere. Branching from the valve 30 is a conduit 32 leading into a conduit 33 connected to a supply of fresh gas, which is anaesthetic gas only, anaesthetic gas diluted with room air, or room air only. Branching from the conduit 33 is a flexible conduit 49 leading via an on-off valve 34 and a flexible conduit 52 to a reservoir bag 35 and to two adjustable, non-return, relief valves 36 and 37 which both communicate directly with the atmosphere. The valve 36 opens if the pressure in the bag 35 is below a selected minimum, and the valve 37 opens if the pressure in the bag 35 is above a selected maximum. The conduit 33 opens into the exhalation duct 21 via a spring-loaded, non-return valve 38 adjustable by means of a knob 38a and serving as a negative-pressure relief valve. Branching from the inhalation duct 19 is a spring-loaded, non-return valve 39 leading to the atmosphere and adjustable by means of a knob 39a and serving as a positive-pressure relief valve. An on-off valve 40 is connected in a compressed-air line 41 connected to the four supply points 8, 13, 14 and 17. The valves 18, 34 and 40 are interconnected mechanically by a linkage 42 indicated in chain lines in FIGURE 2.

This linkage 42 is shown in more detail in FIGURE 4, in which the valves 18 and 34 can be seen to form a single valve unit. This valve unit consists of two circular plates 43 and 44 which have respective major faces ground smooth, and urged into sealing contact under spring force. The plate 43 is fixed and carries a co-axial pin 45 on which the plate 44 is turnably mounted. The plate 44 is formed with three ports 46, 47 and 48, to which are connected the flexible conduit 49, and ducts 50 and 51, respectively. The plate 43 is formed with two diametrically opposite ports to which are connected the flexible conduit 52 and duct 53, respectively. The plate 44 is turned by means of a pin 54 which runs in a fork 55 fixed to a push-pull rod 56 provided at one end with a button 57 (see also FIGURE 1) and at the other end arranged to act on the valve 40.

FIGURE 5 shows the arrangement for operating and adjusting the position of the trigger valve 12. A fixed bracket 58 carries a pin on which is turnably mounted a two-arm lever of which the arm 59a is linked to the wall 26 of the bellows 1 and of which the arm 59b is arranged to act on the valve 12. The valve 12 is fixed to one arm of a bell-crank lever 60 of which the other arm is connected by a rod 61 to a pin 62 mounted eccentrically on a gear wheel 63. The gear wheel meshes with a pinion 64 fixed to a shaft 65 which is provided with a spring-loaded friction clutch 66 and has fixed thereto a control knob 67. Before the pinion 64 can be turned by turning of the knob 67, it is necessary to depress the knob 67 in order to bring friction clutch 66 into operation. Turning of the pinion 64 rocks the bell-crank 60 and thus adjusts the position of the valve 12 relative to the lever 59 and thus to the wall 26 of the bellows 1, whereby the tidal volume can be increased or decreased.

By means of a control lever 68 (see FIGURE 1), the valve 30 can be switched either to interconnect the conduits 29 and 32 (as shown) to give closed-circuit operation, or to interconnect the conduits 29 and 31 to give semi-closed circuit operation. The knobs 69 to 71 in FIGURE 1 are used to adjust the control valve 6, the control valve 5 and the throttle 15, respectively. A manometer 72 is connected in the duct 19.

The size and shape of the unit shown in FIGURE 1 are such that it can sit on either the top shelf or the bottom shelf of a conventional "Boyles" type anaesthetic trolley. It can be seen that all the controls for the unit are grouped together at the front of one side of the unit. The unit is driven by compressed air supplied from a cylinder, pipe line, or compressor, to the line 41 at approximately sixty pounds per square inch. The compressed-air circuit for driving the unit is independent of the gas supply circuit for the patient. The valves 39 and 38 are preferably arranged to open at +30 cm. of water and −10 cm. of water, respectively. The total tidal volume flow is indicated by a gauge 74 provided on the unit and having a transparent pane through which the wall 26 is visible.

The unit is connected to the circle absorber as follows:

The normal fresh gas inlet to the circle absorber is sealed off, for example by clamping a rubber tube with large artery forceps. The rebreathing bag is disconnected from the circle absorber, and the twin breathing tubes are disconnected from the mount on the circle absorber. The outlet at the top panel of the unit is connected by corrugated tubing to the rebreathing mount of the absorber. The manifold 73 in FIGURE 1 has four large bore mouths and one small bore mouth. The two large bore mouths on one side of the manifold are connected to the circle absorber, and the twin breathing tubes mentioned above are connected to the large bore mouths on the other side of the manifold. The small bore mouth is connected to the fresh gas supply, for example to the outlet of an anaesthetic machine.

The operation of the apparatus on semi-closed circuit is as follows:

In the condition shown in FIGURE 2, the apparatus has just changed over to inhalation, the valve 12 having operated to connect the supply point 8 to the line 4. The throttle 6 controls the speed with which the wall 26 moves inwardly and thus the inhalation time. The screw 25 opens the valve 27 just before the wall 26 reaches the end of its inward stroke, so that the lungs are connected to the atmosphere via the duct 21 and the conduits 29 and 31, whereby the change over from inhalation to exhalation can be relatively sudden, although a period of dwell at maximum positive pressure can be provided by setting the valve 39 to open before the screw 25 opens the valve 27. It will be appreciated that the drop from the maximum positive pressure to atmospheric pressure is relatively sudden. The dwell at atmospheric pressure is determined by the setting of the throttle 15 and is continuously variable over a range 0 to 10 seconds. At the end of the adjustable atmospheric dwell the throttle 15 causes a change over of the valve 7 such that the supply point 8 is connected to the line 3 instead of to the line 4. This causes the wall 26 to move outwardly at a rate determined by the throttle 5. Once the screw 25 has allowed the valve 27 to close, the bellows 1 draws exhalation gas out of the patient's lungs so that a negative pressure is produced in the lungs. The maximum negative pressure attained is adjustably controlled by the valve 38 which, when that pressure is attained, opens to allow fresh gas to flow into the exhalation duct 21 from the conduit 33. The dwell at maximum negative pressure is determined by the settings of the throttle 5 and the valve 38. In its outermost position, the wall 26 operates the valve 12, so that the direction of movement of the wall 26 is immediately reversed. The cycle then recommences. If desired, the valve 38 can alternatively be so set that the dwell at atmospheric pressure is immediately followed by a positive increase in pressure.

It will be appreciated that, in the apparatus described, the time interval between maximum negative pressure and maximum positive pressure, the duration of the atmospheric pressure phase, and the time interval between the end of the atmospheric pressure phase and maximum negative pressure, are independently adjustable.

The inhalation volume is continuously variable from 150 to 1,800 cc. without load, but from 50 to 1,200 cc. with load. The inhalation time is continuously variable from 1 to 15 seconds at full volume and normal load, but from 0.5 second to 15 seconds at normal working volume and normal load. Exhalation time at negative pressure is variable from 1 to 15 seconds at full volume, but from 0.5 second to 15 seconds at the normal working volume.

If it is desired that the apparatus should operate on closed circuit, the valve 30 is switched to interconnect the conduits 29 and 32, so that instead of the gas from the valve 27 flowing to the atmosphere via the conduit 31, it flows into the reservoir bag 35. By arranging for the bag 35 to be only partly distended by the fresh gas from the conduit 33, the pressure in the bellows 1 will still be brought rapidly to approximately atmospheric pressure on opening of the valve 27. The valve 37 would be arranged to open at, say, +0.5 cm. $H_2O$. Instead of having an approximately atmospheric pressure phase, it would be possible to have a phase at, say, approximately +5 cm. $H_2O$ by suitably loading the valve 37 and by arranging for the fresh gas flow via the conduit 33 fully to distend the bag 35.

If it is desired that the circle absorber alone should be used under manual operation then the button 57 is pulled to close the two valves 34 and 40 and to cause the valve 18 to interconnect the ducts 50 and 53.

The apparatus may be used to give i.p.p. (intermittent positive pressure) resuscitation. For this, the flexible duct 51 is connected directly to one port of the valve 39, of which the other port is directly connected to one of the two ports of the valve 38 which are in the duct 21. The other of these two ports is connected via a non-return valve to the patient.

Should it be desired to use a Waters' canister instead of a circle absorber, then the squeeze bulb is removed from one end of the Waters' canister, and the flexible duct 51 is connected via the valve 39 to that one end. The other end of the Waters' canister is connected to the patient and to the conduit 33 via the valve 38. The port of the valve 38 normally leading to the exhalation valve 22 is closed off.

In the version shown in FIGURES 6 and 7, a patient-triggered mechanism is provided whereby, at the end of the suction or exhalation stroke of the bellows 1, a slight inhalation by the patient will cause commencement of the exhaust or inhalation stroke of the bellows 1. The patient-triggered mechanism includes a sensing device 80 which is connected via a duct 81 to the flexible hose 82 leading to the patient from the junction of the ducts 19 and 21. A manometer 83 corresponding to the manometer 72 is connected in the duct 81. A branch pipe 84 leads from the pipeline 10 to an air inlet 85 of the sensing device 80, and a pipe 86 leads from an air outlet 87 of the device 80 via a non-return valve 88 to the line 10. The pipes 84 and 86 and the device 80 can by-pass an adjustable throttle 89 connected in the line 10. Connected in the line 10 downstream of the junction between the pipe 86 and the line 10 is a two-way, three-port, trigger valve 90 which is connected to a compressed-air supply point 91 and which is similar to the valve 11. The sensing device 80 includes a large-area diaphragm 92 contained in a small-volume, cylindrical chamber 93 of which the general axial dimension is small compared with its diameter. A helical spring 94 acts between a boss 95 of the diaphragm 92 and a manually adjustable set screw 96 for adjusting the sensitivity of the sensing device 80. The inlet 85 leads to the chamber 93 via a valve consisting of a valve seat 97 and a valve closure ball 98. The ball 98 is urged towards the valve seat 97 by the boss 95. The pressure of the air in the inlet 85 acts, via the ball 98, on one face of the diaphragm 92, while the spring 94 and the pressure in the duct 81 act on the other face of the diaphragm 92. Leading from that one face of the diaphragm is the air outlet 87 and a bleed duct 99.

The patient-triggered mechanism operates as follows:

The set screw 96 is adjusted such that the resultant force on the diaphragm 92 is just sufficient to maintain the ball 98 on the seat 97 during operation of the apparatus without respiration by the patient. When the wall 26 reaches the end of its suction stroke and thus operates the valve 12 to connect the supply point 14 to the line 10, the compressed air from the point 14 will flow through the adjustable throttle 89 to the trigger valve 90. The valve 90 will thus be operated on elapse of an adjustable period of time from operation of the valve 12. Operation of the valve 90 will of course change over the valve 7 as in the version described with reference to FIGURES 1 to 5. Provided that the patient does not attempt to inhale during this period of time, the air cannot by-pass the throttle 89 via the pipes 84 and 86, because the ball 98 closes the inlet 85. However, should the patient attempt to inhale during this period of time, so that a suction force of sufficient magnitude is applied to the diaphragm by way of the duct 81, the diaphragm will move to a small extent against the pressure of the spring 94, thus allowing a little air to enter the chamber 93 from the valve 97, 98. Because the diaphragm is of a large surface area and the chamber 93 has a small volume, the escape into the chamber 93 of even this little amount of compressed air will cause the diaphragm 92 to move rapidly against the pressure of the spring 94 and thus cause the valve 97, 98 to snap open. The air pressure rises rapidly and air flows from the outlet 87 through the non-return valve 88 and into the line 10, whereby the throttle 89 is suddenly by-passed and the valve 7 changed over to cause the wall 26 to commence its exhaust stroke. This causes the valve 12 to connect the line 10 to the atmosphere, so that the spring 94 tends to close the valve 97, 98. However, in practice, because of the presence of the non-return valve 88 there is found to be a small residual amount of air in the chamber 93, and this is bled out through the duct 99.

In actual practice, the duct 81 is led to as near the patient's lungs as is possible, and the sensing device 80 operates even if a very small suction force, say less than 1 cm. H₂O, is applied to the diaphragm 92 via the pipe 81.

By completely closing the throttle 89, the apparatus is arranged to be purely patient triggered at the end of the suction stroke of the wall 26.

In the version shown in FIGURE 8, corresponding parts to those shown in FIGURES 1 to 7 have reference numerals increased by 100. Driven by the double-acting piston-and-cylinder device 102 are twin bellows 200 and 207. The bellows 201 supplies inhalation gas via the duct 119 to the patient, whereas the bellows 200 draws exhalation gas from the patient via the duct 121. Provided in the ducts 119 and 121 is a slide valve 202 which forms the exhalation valve and the inhalation valve and which, in the right-hand end position shown, prevents gas flow through the duct 121 but permits gas flow through the duct 119, and, in its left-hand end position, permits gas flow through the duct 121 but prevents gas flow through the duct 119. Connected to the left-hand end and the right-hand end of the valve 202 are respective pipes 203 and 204 branching from the lines 109 and 110 at locations upstream of the throttles 115 and 189, respectively. Disposed in the wall 128 of the bellows 200 is the non-return valve 127 leading to a conduit 205. This in turn leads to a three-port, two-way valve 206 which connects the conduit 205 either directly to the ambient air via a conduit 207, or to the reservoir bag 135 via conduits 208 and 209. A conduit 210 connects the bellows 200 via a non-return valve 211 to a three-port, two-way valve 212. The valve 212 can connect the conduit 210 either directly to the ambient atmosphere via a conduit 213, or as shown via a conduit 214 to the conduit 209. One end of the conduit 209 is supplied with fresh gas, as indicated by the arrow C, and the other end of the conduit 209 is closed by the spring-loaded non-return valve 138. Interposed in the conduit 209 between the valve 138 and the conduit 208 is a three-port, two-way valve 215 which can occupy either a position in which it interconnects the two ends of the conduit 209, as shown, or a position in which it connects directly to the atmosphere, via a conduit 216, that end of the conduit 209 which is closed by the valve 138. A conduit 217 leads from the conduit 209 via a non-return valve 218 to the bellows 201. Disposed at the inlet and outlet ends of the absorber 123 are two three-port, two-way valves 219 and 220 which can occupy either the position shown in which the absorber 123 is connected into the duct 121, or a position in which the exhalation gas by-passes the absorber 123 via a by-pass duct 221. The valves 206, 212 and 215 are ganged together such that, for closed-circuit operation, the valves occupy the positions shown, while, for semi-closed circuit operation of the apparatus, the valve 206 occupies its non-illustrated position and the valves 212 and 215 occupy the positions shown, and for open-circuit operations, all three valves occupy their non-illustrated positions. A three-position control (not shown) enables the operator to set the positions of the three valves 206, 212, and 215.

For closed-circuit respiration the apparatus operates as follows:

In the position shown, the apparatus has just changed over to the inhalation phase, so that the wall 126 is moving towards the wall 128. Since the valve 202 is in its right-hand position, inhalation gas is flowing from the bellows 201 to the patient, the valve 218 preventing flow from the bellows 201 to the conduit 209. The gas in the bellows 200 is meanwhile flowing via the conduits 210 and 209 into the reservoir bag. As the wall 126 nears the wall 128, the valve 127 is opened and the valve 116 is actuated to connect the line 109 to the point 117. Immediately, compressed air flows through the pipe 204 and displaces the valve 202 into its left-hand end position. This causes the pressure in the patient's lungs to drop quickly to approximately atmospheric pressure, because the lungs are connected to the reservoir bag 135 via the conduits 209, 208 and 205, and the duct 121, the valves 219 and 220 being of course in the positions shown which they occupy for closed and semi-closed circuit operation. After a period of time determined by the throttle 115, the valve 107 is changed over to cause the wall 126 to perform its suction stroke. During this suction stroke, the bellows 200 draws exhalation gas from the patient via the duct 121, while the bellows 201 is filled with inhalation gas via the conduit 217 from the fresh gas supply C and the reservoir 135. If the pressure in the patient's lungs tends to fall below a desired negative value, then the valve 138 will open to permit flow of gas into the bellows 200 from the conduit 209. When the wall 126 reaches the end of its suction stroke, it actuates the valve 112 to cause the compressed air from the point 114 to flow through the pipe 203 and displace the valve 202 into the right-hand end position shown. The wall 126 commences its next exhaust stroke after a period of time determined by the throttle 189, unless of course the patient-triggered mechanism operates to by-pass the device 189 in the manner described with references to FIGURES 6 and 7.

For semi-closed circuit operation, the valve 206 occupies the position in which it interconnects the conduits 205 and 207, so that, on opening of the valve 127 the gas flows from the bellows 200 into the ambient atmosphere instead of into the bag 135. Otherwise the operation of the apparatus is the same as for closed-circuit operation.

When the apparatus is operating on open-circuit, the valve 212 interconnects the conduits 213 and 210, and the valve 206 interconnects the conduits 207 and 205, so that, during the exhaust stroke of the wall 126, the gas in the bellows 200 flows through the conduits 207 and 213 directly into the atmosphere. The valve 215 is in such a position that, during the suction stroke of the wall 126 and when the valve 138 opens, air is drawn in through the conduit 216. The valves 219 and 220 occupy the position in which the exhalation gas flows through the by-pass 221.

I claim:

1. A respiratory apparatus comprising a container, an exhalation duct connected to said container for communicating said container with a patient's lungs, wall means of said container movable to contract the interior of said container and to expand said interior to draw exhalation gas through said exhalation duct, driving means for moving said wall means to expand and contract said interior, conduit means leading from said interior to a location at which there is substantially atmospheric pressure, valve means serving to control the flow of gas through said conduit means, means for use in producing positive pressure in said lungs, actuating means co-operating with said valve means for opening said valve means during each breathing cycle when there is, in said lungs, approximately maximum positive pressure which is greater than the pressure at said location, thereby to connect said lungs to said location by way of said exhalation duct and said interior, and for maintaining said valve means open, thereby to cause the pressure in said container to drop sharply to approximately the pressure at said location, and adjustable, pneumatic control means for adjustably controlling the time interval over which said valve means is open.

2. A respiratory apparatus comprising a container for connection via an exhalation duct with a patient's lungs, wall means of said container movable to contract the interior of said container and to expand said interior to draw exhalation gas through said exhalation duct, driving means for moving said wall means to expand and contract said interior, a first conduit leading from said interior, a second conduit leading from said first conduit to the ambient atmosphere, a reservoir of which the interior is always at approximately atmospheric pressure, a third conduit leading from the junction of said first conduit and said second conduit to the interior of said reservoir, first valve means at said junction operable selectively to interconnect said first conduit and said second conduit, or said first conduit and said third conduit, second valve means serving to control the flow of gas through said first conduit, means for use in producing positive pressure in said lungs, actuating means co-operating with said second valve means for opening said second valve means when there is approximately maximum positive pressure in said lungs thereby to connect said lungs to said ambient atmosphere or said reservoir by way of said exhalation duct and the interior of said container, and adjustable control means for adjustably controlling the time interval over which said second valve means is open.

3. A respiratory apparatus comprising a container, an exhalation duct connected to said container for communicating said container with a patient's lungs, a wall of said container movable to contract the interior of said container and to expand said interior to draw exhalation gas through said exhalation duct, a double-acting piston-and-cylinder device of which the piston is connected to said wall for reciprocating said wall over a pre-determined stroke length to expand and contract said interior, change-over valve means, first pipe means connecting one end of the cylinder of said device to said change-over valve means for supplying compressed air to said one end of said cylinder, second pipe means connecting the other end of said cylinder to said change-over valve means for supplying compressed air to said other end of said cylinder, third pipe means leading to said change-over valve means for supplying compressed air alternately to said first pipe means and said second pipe means, first triggering means operated by arrival of said wall in the region of the end of its suction stroke and connected to said change-over valve means for operating said change-over valve means in one direction, second triggering means operated by arrival of said wall in the region of the end of its exhaust stroke, and connected to said change-over valve means for operating said change-over valve means in the opposite direction, an adjustable delay device interposed between said second triggering means and said change-over valve means for adjustably delaying operation of said change-over valve means in said opposite direction following operation of said second triggering means, conduit means leading from said interior to a location at which there is substantially atmospheric pressure at least, second valve means serving to control the flow of gas through said conduit means, means for use in producing positive pressure in said lungs, and actuating means co-operating with said second valve means for opening said second valve means during each breathing cycle when said wall is in the region of the end of its exhaust stroke thereby to connect said lungs to said location by way of said exhalation duct and said interior and for maintaining said valve means open, thereby to cause the pressure in said container to drop sharply to approximately the pressure at said location.

4. A respiratory apparatus comprising a container for connection via an exhalation duct with a patient's lungs, wall means of said container movable to contract the interior of said container and to expand said interior to draw exhalation gas through said exhalation duct, driving means for moving said wall means to expand and contract said interior, conduit means leading from said interior to a location at which there is substantially atmospheric pressure at least, valve means serving to control the flow of gas through said conduit means, means for use in producing positive pressure in said lungs, actuating means co-operating with said valve means for opening said valve means when there is in said lungs, approximately maximum positive pressure which is greater than the pressure at said location, thereby to connect said lungs to said location by way of said exhalation duct and said interior, adjustable control means for adjustably controlling the time interval over which said valve means is open, further conduit means connected to said interior, first and second valves connected in said further conduit means for controlling gas flow therein, a first plate, portions of one major surface of said first plate defining therethrough first and second ports of said first and second valves, respectively, a second plate having one major surface in face-to-face contact with said one major surface of said first plate and turnable about an axis at right-angles to the one major surface, and portions of said one major surface of said second plate defining therethrough third and fourth ports of said first and second valves, respectively, and registrable with said first and second ports.

5. A respiratory apparatus comprising a container, an exhalation duct connected to said container for communicating said container with a patient's lungs, a wall of said container movable to contract the interior of said container and to expand said interior to draw exhalation gas through said exhalation duct, driving means connected to said wall for reciprocating said wall over a pre-determined stroke length to expand and contract said interior, change-over means controlling said driving means for reversing the direction of movement of said wall, adjustable first triggering means operated by arrival of said wall in the region of the end of its suction stroke and controlling said change-over means, adjusting means connected to said first triggering means for adjusting the position of said first triggering means thereby to adjust the maximum volume of said interior, second triggering means operated by arrival of said wall in the region of the end of its exhaust stroke and controlling said change-over means, an adjustable delay means interposed between said second triggering means and said change-over means for adjustably delaying operation of said change-over means following operation of said second triggering means, conduit means leading from said interior to a location at which there is substantially atmospheric pressure at least, second valve means serving to control the flow of gas through said conduit means, means for use in producing positive pressure in said lungs, and actuating means co-operating with said second valve means for opening said second valve means during each breathing cycle when said wall is in the region of the end of its exhaust stroke thereby to connect said lungs to said location by way of said exhalation duct and said interior and for maintaining said valve means open, thereby to cause the pressure in said container to drop sharply to approximately the pressure at said location.

6. A respiratory apparatus comprising a container for connection via an exhalation duct with a patient's lungs, a wall of said container movable to contract the interior of said container and to expand said interior to draw exhalation gas through said exhalation duct, driving means connected to said wall for reciprocating said wall over a pre-determined stroke length to expand and contract said interior, change-over means controlling said driving means for reversing the direction of movement of said wall, adjustable first triggering means operated by arrival of said wall in the region of the end of its suction stroke and controlling said change-over means, a first two-arm lever of which one arm is connected to said wall and of which the other arm operates said first triggering means, pivot means on which said first two-arm lever is pivoted, a second two-arm lever which is pivoted on said pivot means co-axially with said first two-arm lever and of which one arm has mounted thereon said first triggering means, adjusting means connected to the other arm of said second two-arm lever for adjusting the position of said first triggering means thereby to adjust the maximum volume of said interior, second triggering means operated by arrival of said wall in the region of the end of its exhaust stroke and controlling said change-over means, an adjustable delay means interposed between said second triggering means and said change-over means for adjustably delaying operation of said change-over means following operation of said second triggering means, conduit means leading from said interior to a location at which there is substantially atmospheric pressure at least, second valve means serving to control the flow of gas through said conduit means, means for use in producing positive pressure in said lungs, and actuating means co-operative with said second valve means for opening said second valve means when said wall is in the region of the end of its exhaust stroke thereby to connect said lungs to said location by way of said exhalation duct and said interior.

7. A respiratory apparatus comprising a bellows for connection via an exhalation duct with a patient's lungs, a fixed wall of said bellows, a flexible wall of said bellows connected to said fixed wall, a movable wall of said bellows connected by way of said flexible wall to said fixed wall and movable to contract the interior of said bellows and to expand said interior to draw exhalation gas through said exhalation duct, driving means connected to said movable wall for reciprocating said movable wall towards and away from said fixed wall to expand and contract said interior, portions of said fixed wall defining an aperture therein communicating with said interior, conduit means leading from said aperture and away from said interior to a location at which there is substantially atmospheric pressure at least, a non-return valve, a closure member of said non-return valve mounted in said aperture for controlling the flow of gas through said conduit means, a projecting member connected to said closure member and projecting into said interior, means for use in producing positive pressure in said lungs, actuating means with which said movable wall is provided and which co-operates with said projecting member for opening said closure member when said movable wall is in the region of the end of its exhaust stroke thereby to connect said lungs to said location by way of said exhalation duct and said interior, and adjustable control means for adjustably controlling the time interval over which said closure member is open.

8. A respiratory apparatus comprising a container for connection via an exhalation duct with a patient's lungs, wall means of said container movable to contract the interior of said container and to expand said interior to draw exhalation gas through said exhalation duct, driving means for moving said wall means to expand and contract said interior, a manifold for communicating with said container, means for use in producing positive pressure in said lungs and including an inhalation duct portion forming part of said manifold, a positive pressure relief valve connected to said duct portion for controlling the maximum positive pressure therein, an exhalation duct portion forming part of said manifold, a negative pressure relief valve connected to said exhalation duct portion for controlling the maximum negative pressure therein, conduit means leading from said interior to said exhalation duct portion and to a location at which there is substantially atmospheric pressure at least, portions of said conduit means defining a port therein closed by said negative pressure relief valve and in communication with said location, valve means serving to control the flow of gas from said interior and through said conduit means, actuating means co-operative with said valve means for opening said valve means when there is in said lungs, approximately maximum positive pressure, which is greater than the pressure at said location, thereby to connect said lungs to said location by way of said exhalation duct and said interior, and adjustable control means for adjustably controlling the time interval over which said valve means is open.

9. A respiratory apparatus comprising a container for connection via an exhalation duct with a patient's lungs a wall of said container movable to contract the interior of said container and to expand said interior to draw exhalation gas through said exhalation duct, driving means connected to said wall for reciprocating said wall over a pre-determined stroke length to expand and contract said interior, change-over means controlling said driving means for reversing the direction of movement of said wall, adjustable first triggering means operated by arrival of said wall in the region of the end of its suction stroke, first adjustable delay means interposed between said first triggering means and said change-over means for adjustably delaying operation of said changeover means following operation of said first triggering means, second triggering means operated by arrival of said wall in the region of the end of its exhaust stroke and controlling said changeover means, a second adjustable delay means interposed between said second triggering means and said change-over means for adjustably delaying operation of said changeover means following operation of said second triggering means, a patient-triggered mechanism operable to render ineffective said first adjustable delay means on the patient's attempting to inhale, conduit means leading from said interior to a location at which there is substantially atmospheric pressure at least, second valve means serving to control the flow of gas through said conduit means, means for use in producing positive pressure in said lungs, and actuating means co-operating with said second valve means for opening said second valve means when said wall is in the region of the end of its exhaust stroke thereby to connect said lungs to said location by way of said exhalation duct and said interior.

10. A respiratory apparatus comprising a container for connection via an exhalation duct with a patient's lungs, a wall of said container movable to contract the interior of said container and to expand said interior to draw exhalation gas through said exhalation duct, a double-acting piston-and-cylinder device of which the piston is connected to said wall for reciprocating said wall over a pre-determined stroke length to expand and contract said interior, change-over valve means, first pipe means connecting one end of the cylinder of said device to said change-over valve means for supplying compressed air to said one end of said cylinder, second pipe means connecting the other end of said cylinder to said change-over valve means for supplying compressed air to said other end of said cylinder, third pipe means leading to said change-over valve means for supplying compressed air alternately to said first pipe means and said second pipe means, first triggering means operated by arrival of said wall in the region of the end of its suction stroke for pneumatically operating said change-over valve means, fourth pipe means leading from said first triggering means to said change-over valve means for conducting compressed air from said first triggering means to said change-over valve means to operate the latter, adjustable throttle means inserted in said fourth pipe means for adjustably delaying operation of said change-over valve means following operation of said first triggering means, by-pass pipe means connected across said throttle means for by-passing said throttle means, a patient-operated sensing means for detecting an attempt by the patient to inhale, a patient-operated valve controlled by said sensing device and interposed in said by-pass pipe means for opening to render ineffective said adjustable throttle means, second triggering means operated by arrival of said wall in the region of the end of its exhaust stroke and pneumatically connected to said change-over valve means for pneumatically operating said change-over valve means, an adjustable pneumatic delay device interposed between said second triggering means and said change-over valve means for adjustably delaying operation of said change-over valve means in said opposite direction following operation of said second triggering means, conduit means leading from said interior to a location at which there is substantially atmospheric pressure at least, second valve means serving to control the flow of the gas through said conduit means, means for use in producing positive pressure in said lungs, and actuating means co-operating with said second valve means for opening said second valve means when said wall is in the region of the end of its exhaust stroke thereby to connect said lungs to said location by way of said exhalation duct and said interior.

11. A respiratory apparatus comprising a container for connection via an exhalation duct with a patient's lungs, a wall of said container movable to contract the interior of said container and to expand said interior to draw exhalation gas through said exhalation duct, a double-acting piston-and-cylinder device of which the piston is connected to said wall for reciprocating said wall over a pre-determined stroke length to expand and contract said interior, change-over valve means, first pipe means connecting one end of the cylinder of said device to said change-over valve means for supplying compressed air to said one end of said cylinder, second pipe means connecting the other end of said cylinder to said change-over valve means for supplying compressed air to said other end of said cylinder, third pipe means leading to said change-over valve means for supplying compressed air alternately to said first pipe means and said second pipe means, first triggering means operated by arrival of said wall in the region of the end of its suction stroke for pneumatically operating said change-over valve means, fourth pipe means leading from said first triggering means to said change-over valve means for conducting compressed air from said first triggering means to said change-over valve means to operate the latter, adjustable throttle means inserted in said fourth pipe means for adjustably delaying operation of said change-over valve means following operation of said first triggering means, by-pass pipe means connected across said throttle means for by-passing said throttle means, a patient-operated sensing device, portions of said sensing device defining therein a chamber of large dimension in first and second mutually perpendicular directions but of small dimension in a direction perpendicular to said first and second directions, a diaphragm partitioning said chamber and extending in said first and second directions, an inlet of said chamber forming part of said by-pass pipe means and leading to one side of said diaphragm, an outlet of said chamber forming part of said by-pass pipe means and leading from said one side of said diaphragm, portions of said inlet defining a narrow bore and a valve seat encircling said bore, adjustable biasing means urging said diaphragm towards said valve seat, a valve closure member urged by said diaphragm into co-operation with said valve seat for preventing by-passing of said adjustable throttle means, duct means leading to the other side of said diaphragm for applying at said other side a suction pressure caused by a patient's attempting to inhale thereby to cause said closure member to open, second triggering means operated by arrival of said wall in the region of the end of its exhaust stroke and pneumatically connected to said change-over valve means for pneumatically operating said change-over valve means, an adjustable pneumatic delay device interposed between said second triggering means and said change-over valve means for adjustably delaying operation of said change-over valve means in said opposite direction following operation of said second triggering means, conduit means leading from said interior to a location at which there is substantially atmospheric pressure at least, second valve means serving to control the flow of gas through said conduit means, means for use in producing positive pressure in said lungs, and actuating means co-operating with said second valve means for opening said second valve means when said wall is in the region of the end of its exhaust stroke thereby to connect said lungs to said location by way of said exhalation duct and said interior.

12. A respiratory apparatus comprising a container for connection via an exhalation duct with a patient's lungs, a wall of said container movable to contact the interior of said container and to expand said interior to draw exhalation gas through said exhalation duct, a double-acting piston-and-cylinder device of which the piston is connected to said wall for reciprocating said wall over a pre-determined stroke length to expand and contract said interior, change-over valve means, first pipe means connecting one end of the cylinder of said device to said change-over valve means for supplying compressed air to said one end of said cylinder, second pipe means connecting the other end of said cylinder to said change-over valve means for supplying compressed air to said other end of said cylinder, third pipe means leading to said change-over valve means for supplying compressed air alternately to said first pipe means and said second pipe means, first triggering means operated by arrival of said wall in the region of the end of its suction stroke for pneumatically operating said change-over valve means, fourth pipe means leading from said first triggering means to said change-over valve means for conducting compressed air from said first triggering means to said change-over valve means to operate the latter, adjustable throttle means inserted in said fourth pipe means for adjustably delaying operation of said change-over valve means following operation of said first triggering means, by-pass pipe means connected across said throttle means for by-passing said throttle means, a patient-operated sensing device, portions of said sensing device defining therein a chamber of large dimension in first and second mutually perpendicular directions but of small dimension in a direction perpendicular to said first and second directions, a diaphragm partitioning said chamber and extending in said first and second directions, an inlet of said chamber forming part of said by-pass pipe means and leading to one side of said diaphragm, an outlet of said chamber forming part of said by-pass pipe means and leading from said one side of said diaphragm, portions of said inlet defining a narrow bore and a valve seat encircling said bore, adjustable biasing means urging said diaphragm towards said valve seat, a valve closure member urged by said diaphragm into co-operation with said valve seat for preventing by-passing of said adjustable throttle means, duct means leading to the other side of said diaphragm for applying at said other side a suction pressure caused by a patient's attempting to inhale thereby to cause said closure member to open, a bleed duct leading from said one side of said diaphragm for bleeding away residual air, second triggering means operated by arrival of said wall in the region of the end of its exhaust stroke and pneumatically connected to said change-over valve means for pneumatically operating said change-over valve means, an adjustable pneumatic delay device interposed between said second triggering means and said change-over valve means for adjustably delaying operation of said change-over valve means in said opposite direction following operation of said second triggering means, conduit means leading from said interior to a location at which there is substantially atmospheric pressure at least, second valve means serving to control the flow of gas through said conduit means, means for use in producing positive pressure in said lungs, and actuating means co-operating with said second valve means for opening said second valve means when said wall is in the region of the end of its exhaust stroke thereby to connect said lungs to said location by way of said exhalation duct and said interior.

13. A respiratory apparatus comprising a first container, first connecting means for connecting said first container via an exhalation duct to a patient's lungs, first wall means of said first container movable to contract the interior of said first container and to expand said interior to draw exhalation gas through said first connecting means, a second container, second connecting means for connecting said second container via an inhalation duct to a patient's lungs, second wall means of said second container fixed to said first wall means and movable to contract the interior of said second container and to expand the latter interior to expel inhalation gas through said second connecting means, driving means for moving said first and second wall means to expand and contract the interiors, conduit means leading from the interior of said first container to a location at which there is substantially atmospheric pressure at least, valve means serving to control the flow of gas through said conduit means, actuating means co-operating with said valve means for opening said valve means when there is, in said lungs, approximately maximum positive pressure, which is greater than the pressure at said location, thereby to connect said lungs to said location by way of said exhalation duct and said interior, and adjustable control means for adjustably controlling the time interval over which said valve means is open.

14. A respiratory apparatus comprising a container for connection via an exhalation duct with a patient's lungs, wall means of said container movable to contract the interior of said container and to expand said interior to draw exhalation gas through said exhalation duct, pneumatically operated, reciprocating, driving means connected to said wall means for reciprocating said wall means over a pre-determined stroke length to expand and contract said interior, conduit means leading from said interior to a location at which there is substantially atmospheric pressure at least, valve means serving to control the flow of gas through said conduit means, means for use in producing positive pressure in said lungs, actuating means co-operating with said valve means for opening said valve means when there is, in said lungs, approximately maximum positive pressure, which is greater than the pressure at said location, thereby to connect said lungs to said location by way of said exhalation duct and said interior, pneumatic change-over means controlling said driving means for reversing the direction of movement of said wall means, a first pipe means, first pneumatic triggering means operated by arrival of said wall means in the region of the end of its suction stroke and connected by way of said first pipe means to said changeover means for controlling the latter, a second pipe means, second pneumatic triggering means operated by arrival of said wall means in the region of the end of its exhaust stroke and connected by way of said second pipe means to said change-over means, an adjustable delay means inserted in said second pipe means for adjustably delaying operation of said change-over means following operation of said second triggering means, slide valve means forming an exhalation valve and an inhalation valve and operable in one direction to open said exhalation valve and close said inhalation valve and operable in the opposite direction to open said inhalation valve and to close said exhalation valve, third pipe means leading from said first pipe means to one end of said slide valve means for enabling said first pneumatic triggering means to operate said slide valve means in said one direction, and fourth pipe means leading from said second pipe means, at a location intermediate said second pneumatic triggering means and said delay means, to the opposite end of said slide valve means for enabling said second pneumatic triggering means to operate said slide valve means in said opposite direction.

15. A respiratory apparatus comprising a container for connection via an exhalation duct with a patient's lungs, wall means of said container movable to contract the interior of said container and to expand said interior to draw exhalation gas through said exhalation duct, driving means for moving said wall means to expand and contract said interior, conduit means leading from said interior to a location at which there is substantially atmospheric pressure at least, valve means serving to control the flow of gas through said conduit means, means for use in producing positive pressure in said lungs, actuating means co-operating with said valve means for opening said valve means when there is, in said lungs, approximately maximum positive pressure, which is greater than the pressure at said location thereby to connect said lungs to said location by way of said exhalation duct and said interior, adjustable control means for adjustably controlling the time interval over which said valve means is open, further conduit means leading from said interior to said location, further valve means disposed in said further conduit means and the first-mentioned conduit means, ganged together and operable to connect said further conduit means and said first-mentioned conduit means for one of closed-circuit operation, semiclosed-circuit operation and open-circuit operation of said apparatus.

References Cited

UNITED STATES PATENTS

| 3,046,979 | 7/1962 | Andreasen | 128—29 |
| 3,058,460 | 10/1962 | Goodner | 128—29 |
| 3,114,365 | 12/1963 | Franz | 128—29 |
| 3,126,001 | 3/1964 | Enestrom | 128—29 |
| 3,251,359 | 5/1966 | Ismach | 128—29 |

RICHARD A. GAUDET, *Primary Examiner.*

C. F. ROSENBAUM, *Assistant Examiner.*